Aug. 12, 1969
W. R. LEOPOLD, JR., ET AL  3,460,553
METHOD AND CONNECTION FOR ESTABLISHING SERVICE BETWEEN
A PLASTIC MAIN AND PLASTIC SERVICE
PIPE WITH A PLASTIC SERVICE T
Filed Dec. 2, 1966
2 Sheets-Sheet 1
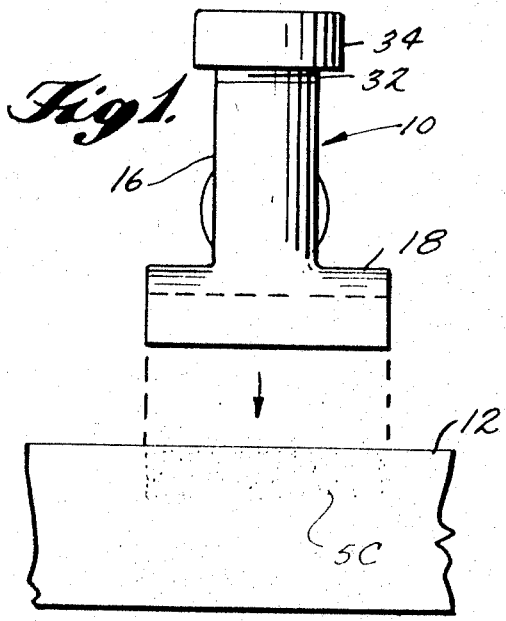
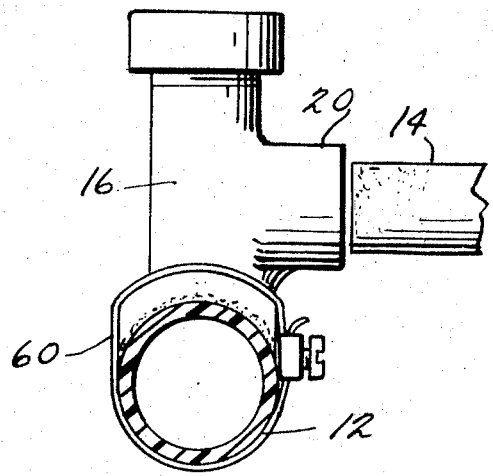
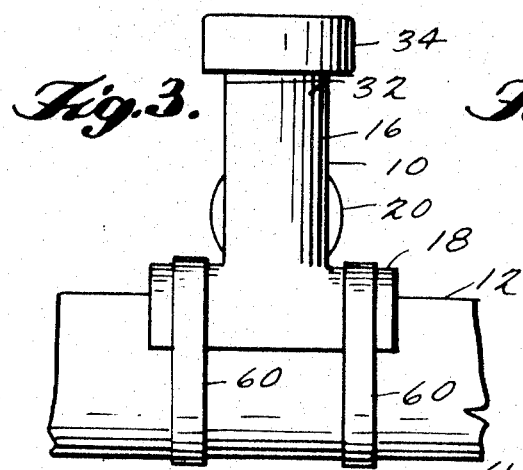
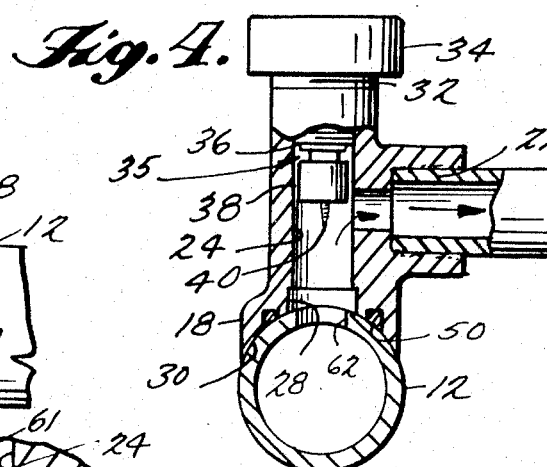
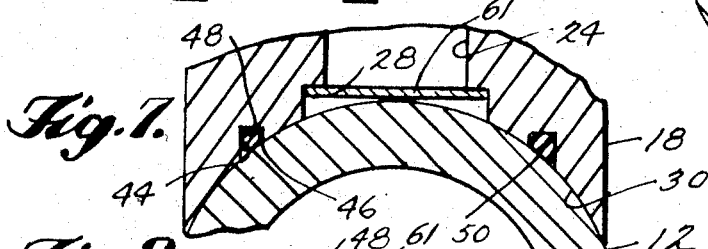
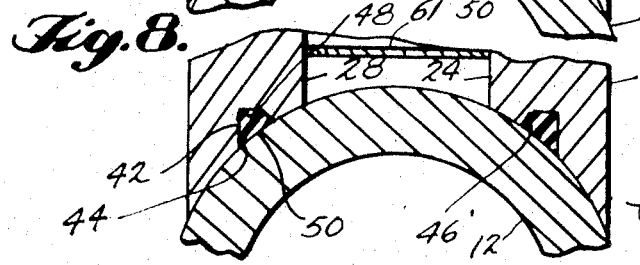
INVENTORS
WILBUR R. LEOPOLD
JOHN J. SMITH
BY CARL E. FLOREN
Cushman, Darby & Cushman
ATTORNEYS INVENTORS
WILBUR R. LEOPOLD
JOHN J. SMITH
CARL E. FLOREN
BY
Cushman, Darby & Cushman
ATTORNEYS United States Patent Office 3,460,553
Patented Aug. 12, 1969

3,460,553
METHOD AND CONNECTION FOR ESTABLISHING SERVICE BETWEEN A PLASTIC MAIN AND PLASTIC SERVICE PIPE WITH A PLASTIC SERVICE T
Wilbur R. Leopold, Jr., John J. Smith, and Carl E. Floren, Decatur, Ill., assignors to Mueller Co., Decatur, Ill., a corporation of Illinois
Filed Dec. 2, 1966, Ser. No. 598,653
Int. Cl. F16l 47/00
U.S. Cl. 137—15　　　　　　　　　　　　　　8 Claims

ABSTRACT OF THE DISCLOSURE

A connection and a method of connecting a plastic service pipe to a plastic main by means of a plastic service T to establish service without the escape of fluid from the main to atmosphere. The connection and method permits immediate tapping of the plastic main after the application of the plastic T to the main as an initial fluid tight seal is made between the main and the plastic T prior to complete formation of the fluid tight seal and ultimate strength of the joint provided by the solvent weld between the plastic T and the main.

---

The present invention is an improvement of the method and connection disclosed in the United States Patent No. 2,839,075 issued June 17, 1958 to Frank H. Mueller and assigned to the same assignee as this application, namely, Mueller Co., Decatur, Ill.

More specifically, the present invention is concerned with a method of establishing service between a plastic main carrying fluid under pressure and a plastic service pipe so as to establish service without the escape of fluid from the main to the atmosphere and to an improved connection utilizing a plastic T between the plastic main and plastic service pipe. Accordingly, the plastic service T utilized in the connection comprises a body member having a through-bore therein opening at one end to a saddle arranged to snugly fit and be connected to the plastic main to be tapped, the plastic T also having a lateral outlet for connection to the plastic service pipe. Provided in the through-bore of the service T is a cutter movable longitudinally therein, the cutter being adapted to cut a coupon out of the main to form a hole therein after a fluid tight connection has been made between the service T and the main and before or after the service pipe has been connected to the T.

In prior connections between plastic mains and plastic service pipes, such service T's used for the connection were not entirely satisfactory for various reasons, among which included the time lag in establishing service due to the length of time necessary to permit setting of the solvent-weld between the plastic main and the saddle of the service T. In such prior methods, before the hole could be cut in the plastic main, there was a relatively long waiting period before the solvent-weld was sufficiently strong to permit tapping of the main without leakage of fluid from the main to atmosphere. If the hole in the main was tapped too soon after application of the solvent cement and before the same had set up the solvent-weld, the joint was not strong enough and small leakage of gas oftentimes occurred creating a potentially hazardous situation. The present invention involves a method which permits immediate tapping of the plastic main after application of the plastic T to the main as an initial fluid tight seal is made between the main and the plastic T prior to complete formation of the fluid tight seal by the solvent-weld between the plastic T and the main. This is accomplished by providing the contact surface of the saddle of the plastic T with a groove having an O-ring or other compressible seal therein, the O-ring seal encircling the opening to the saddle of the through-bore in the plastic T so that when the plastic T is positioned on the main, after application of the solvent cement to the main and the saddle, and when a temporary pressure is maintained between the main and the plastic T, an initial seal is provided that permits immediate operation of the cutter in the through-bore. The plastic service pipe may be connected to the service T by a solvent-weld before or after cutting the hole in the plastic main as the cutter is capable of plugging the lateral outlet thereby preventing flow from the main until the cutter is retracted in the through-bore.

Accordingly, an object of the present invention is to provide an improved method of establishing service between a plastic main and a plastic service pipe when utilizing a plastic T, as well as an improved connection resulting from such method, the method and connection resulting in safer operation with a material decrease in the cost of labor and time.

Another object of the present invention is to provide a method and connection for establishing service between a plastic main and a plastic pipe with a service T in which an immediate pressure seal is made upon positioning of the plastic T on the plastic main, with ultimate strength and fluid tight seal of the joint resulting from the formation of the solvent-weld after the solvent cement has time to set. By such an arrangement and by utilizing temporary means to provide strength to the joint, the plastic main can be immediately tapped without waiting for forming of the solvent-weld.

These and other objects of the present invention will appear more fully from the following specification, claims and drawings in which:

FIGURE 1 is a side elevational view of a fregmentary portion of the plastic main and of a service T of the present invention, the view illustrating the solvent cement applied to the plastic main and the saddle of the plastic service T about to be positioned thereon to form a joint therewith;

FIGURE 2 is an end elevational view of the plastic service T positioned on the plastic main, the plastic main being shown in section and the preliminary pressure seal having been made;

FIGURE 3 is a side elevational view of the connection shown in FIGURE 2;

FIGURE 4 is a fregmentary sectional view of the plastic T and plastic main and further illustrating the plastic service pipe connected to the plastic main;

FIGURE 7 is an enlarged fragmentary sectional view through a portion of the plastic main and the saddle of the plastic T, the view illustrating one form of groove in the saddle for reception of the O-ring; and FIGURE 8 is a sectional view similar to FIGURE 7 but showing a modification of the groove in the saddle of the plastic T.

Figure 5:
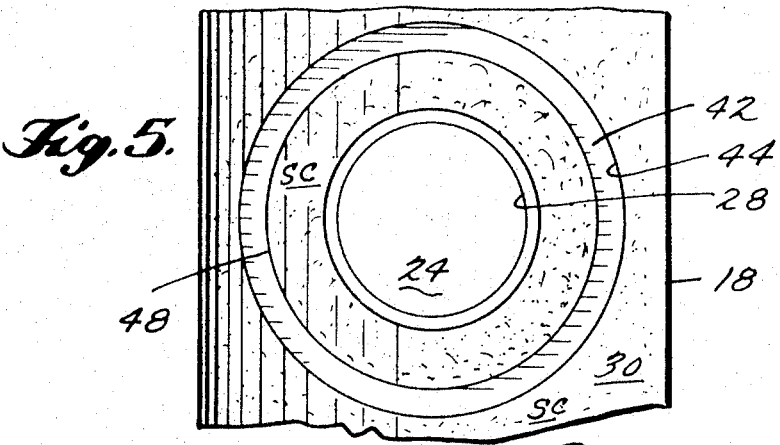
FIGURE 5 is a fragmentary view taken along the section line 5—5 on FIGURE 6, the view illustrating the application of solvent cement to the contacting surface of the saddle of the plastic T and, further, the plastic main being omitted as well as the O ring being omitted from its groove for the purpose of clarity.

Referring now to the drawings wherein like reference numerals or characters represent like or similar parts, there disclosed in FIGURES 1 and 2 a service T 10 made of any suitable plastic known in the art and a plastic main 12 also made of any suitable plastic known in the art. Additionally, as shown in FIGURE 2, a service pipe 14 is shown about to be received in the service T 10, the pipe 14 extending into a dwelling or the like for ultimate use of the gas in the main 12.

The plastic service T 10 includes a body portion 16 having at its lower end a saddle 18 having an arcuate shaped surface 30 of complementary curvature to the exterior surface of the plastic main 12. Extending from the body portion 16 is a lateral outlet 20 having a socket 22 therein tapered in the order of one degree for receiving the straight and cylindrical end of the plastic service pipe 14, the end of pipe 14 conforming to the socket during solvent cementing. Body 16 is provided with a through-bore 24 which is interiorly threaded as indicated at 26, the through-bore opening at 28 to the arcuate surface 30 of saddle 18. The opening 28 of the through-bore 24 provides the inlet end of the through-bore when the saddle 18 is in snug engagement with and sealingly connected to the main 12. The main 12 is tapped through the inlet opening 28 as will be explained later in the specification.

The upper end of the body 16 is exteriorly threaded as indicated at 32 for threadedly receiving a cap 34, which sealingly closes the upper end of the through-bore 24. Removal of the cap 34 provides access to the upper end of through-bore 24 and to a tapping member generally designated at 35. In more detail, the tapping member 35 includes a plug 36 having exterior threads thereon, and a cutter 38 mounted on the lower end of the plug. The plug 36 is threadedly received in the interior threads 26 of the through-bore 24 and any suitable tool may be utilized to rotate the plug so that the tapping tool has longitudinal movement in the through-bore. The plug 36 also supports a pointed metal screw 40 which extends below the edge of the cutter 38 and which as fully disclosed in the aforementioned U.S. Patent 2,839,075, insures that the coupon P cut from the main 12 can be retracted therefrom when the tapping member 35 is retracted in the through-bore.

Figure 6:
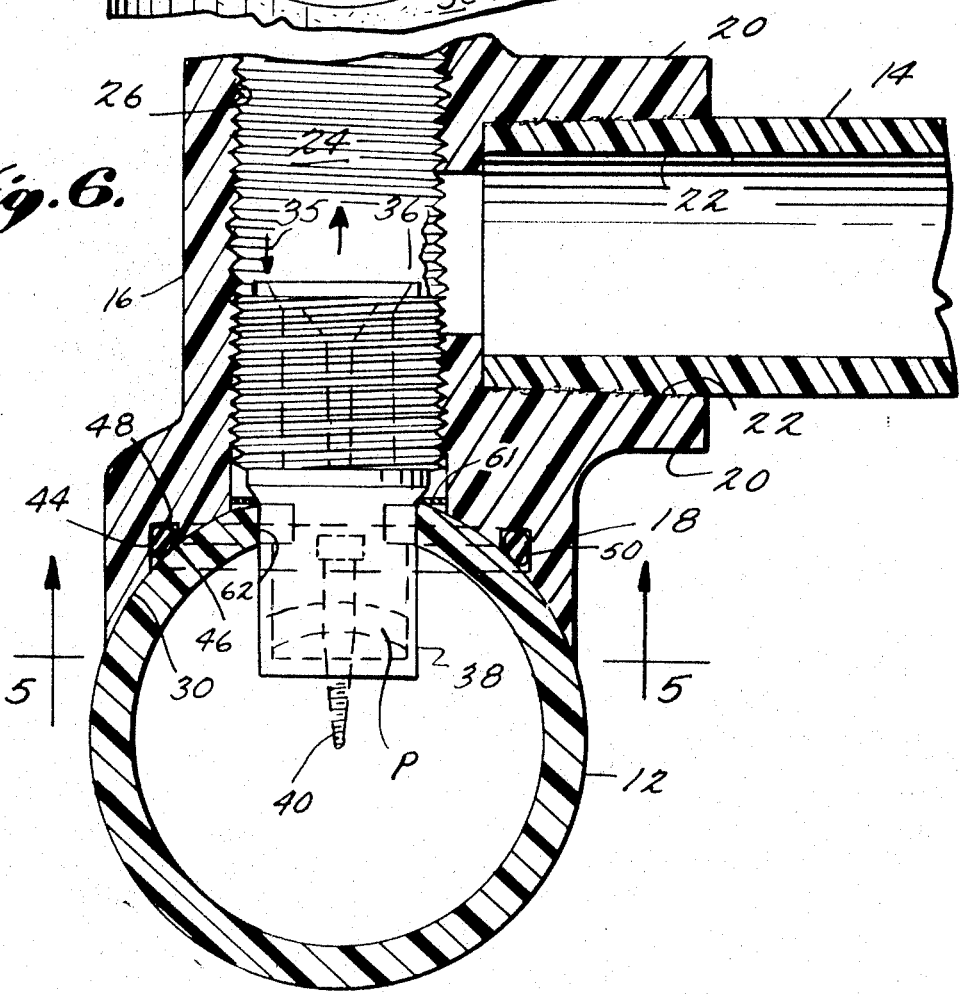
FIGURE 6 is an enlarged fragmentary sectional view of the joint of the present invention and illustrating the position of the parts of the plastic T immediately after the plastic main has been tapped but before the coupon has been withdrawn from the main, the hose clamps being omitted for the purpose of clarity.

Referring now in detail to FIGURES 5-7 inclusive, it will be noted that the arcuate surface 30 of the saddle 18 is provided with a groove 42 circumscribing the inlet opening 28 of the through-bore 24. The groove 42 is molded into the surface 30 when the plastic service T is molded and is provided with an outer side wall 44, an inner side wall 46, and a bottom wall 48. The outer side wall 44 and the inner side wall 46 are parallel to each other and to the axis of the through-bore 24 as undercuts cannot be conveniently molded. Of course if the groove 42 is machined into the saddle 18, then undercuts may be provided in the inner and outer side walls. An O-ring 50 made of a suitable elastomeric material is positioned in the groove at the time the service T is made, the O-ring having a diameter sufficient so that the O-ring, when in its relaxed position in the groove 42 extends slightly outwardly of the curved surface 30 of saddle 18.

A modification of the O-ring groove 42 is disclosed in FIGURE 8 wherein the inner wall of the groove 46' is tapered inwardly toward the outer wall 44'. By tapering the inner wall 46' at an angle to the longitudinal axis of the through-bore 24, relief is provided on the inside of the groove 42, thus, giving the groove some additional volume for the O-ring to deform into yet maintaining sufficient squeeze to hold the O-ring in place.

Referring now to FIGURES 1 to 5 inclusive, the plastic service T 10 when it is to be connected to the plastic main 12, has its tapping member 35 in a retracted position in through-bore 24 so that the cutter 38 and screw 40 do not extend through the opening 28 beyond the surface 30 of the saddle 18. Solvent cement SC is applied to arcuate surface 30 of the saddle 18 both inwardly and outwardly of the groove 42 and O-ring 50 (FIGURE 5) and also solvent cement SC is applied to the area of the plastic main 12 where the hole 62 is to be tapped. A plastic sealing disc 61 is provided in the lower end of bore 24 as a barrier to prevent solvent cement SC from entering the bore and interfering with the threads 26 and, thus the subsequent operation of the tapping member 35. After the saddle 18 of the plastic T 10 is snugly positioned on the plastic main 12 as shown in FIGURES 2 and 3, temporary pressure is applied to the plastic T and plastic main by means of a pair of hose clamps 60 or the like, positioned on opposite sides of the through-bore 24. The hose clamps 60 apply sufficient pressure to enable the O-ring 50 to make an immediate fluid tight seal with the surface of the plastic main 12 around the area where the hole 62 is to be cut. Additionally, the hose clamps 60 function to make a tight contact between the saddle 18 and the plastic main 12 and the pressure from the hose clamps is maintained until the solvent cement SC sets and forms a solvent-weld between the saddle 18 and the main 12. Accordingly, because the hose clamps 60 give immediate strength to the joint between the saddle 18 and the plastic main 12 and further because the O-ring 50 provides an immediate fluid tight seal, the hole 62 in the main 12 can also be cut immediately without danger to the final joint and seal being formed by the solvent cement. This is accomplished by removing the cap 34 from the plastic T 10 and advancing the plug 36 of tapping member 35 in the through-bore until such time that the cutter engages and cuts the coupon P from the main. Of course, in a preferable operation, the service pipe 14 can be solvent-welded in the socket 22 of lateral outlet 20 prior to the tapping operation so that when the tapping operation does occur, the hole can be cut and the coupon P immediately removed from the main so that service is immediately established. It will be understood the tapping operation can be also accomplished prior to the connection of the service pipe 14, if so desired, as the plug 46 of the tapping member can be left in the position shown in FIGURE 6 and thus seal the hole 62 from the lateral outlet 20 until connection of the service pipe 14 has been made. Service can then be established by retracting the tapping member 30.

As mentioned above, the hose clamps 60 not only function to establish the initial immediate fluid tight seal by compressing the O-ring 50, but they also function to provide sufficient pressure between the saddle 18 and the main 12 until such time that the solvent-weld is formed therebetween. Once the solvent-weld has formed and thus provides an ultimate fluid tight seal, giving ultimate strength to the joint, the hose clamps 60 may be removed from the connection.

It will thus be seen that the objects of the present invention have been fully and effectively accomplished. However, it will be apparent that the foregoing specific method and connection for establishing service between a plastic main and a plastic service pipe have been shown and described only for the purpose of illustrating the principles of this invention. The invention also includes all modifications encompassed with the spirit and scope thereof.

What is claimed is:

1. The method of connecting a service pipe to a plastic main by means of a plastic service-T to establish service without the escape of fluid from the main to atmosphere, the plastic T having a through-bore with a cutter movable longitudinally therein for cutting a hole in the main, a lateral outlet for connection to the service pipe and a saddle with an O-ring encircling one end of the through-bore, the steps comprising: providing a temporary barrier in the through-bore adjacent its end opening to the saddle applying a solvent-cement to the surface of the plastic main in the area to be tapped; applying a solvent-cement to the surface of the saddle of the plastic-T; positioning the saddle of the plastic T on the plastic main over the area to be tapped; temporarily applying pressure between the plastic T and the plastic main to initially cause the O-ring to form a fluid-tight seal between the saddle of the plastic T and the plastic main; maintaining the pressure between the plastic main and the service-T until the solvent-cement sets and forms a fluid-tight permanent solvent-weld seal between the saddle and the plastic-T and the plastic main; securing the service pipe to the lateral outlet of the plastic service-T; and cutting the temporary barrier and then cutting a hole in the wall of the main by moving the cutter longitudinally in the through-bore to establish service from the main to the service-T.

2. The method as claimed in claim 1 in which the cutting of the hole in the main is accomplished prior to formation of the solvent-weld.

3. The method as claimed in claim 1 in which the solvent cement is applied to the saddle of the service-T both inwardly and outwardly of the O-ring.

4. A fitting attachable to a plastic main for connecting a service line thereto, said fitting comprising: a plastic service-T having a saddle with a main-engaging surface shaped to snugly engage and to be solvent-welded by a solvent cement to the side of the plastic main, said plastic service-T including a through-bore having one end opening to the main-engaging surface of said saddle, a cutter movable in said through-bore for cutting a hole in the plastic main, a lateral outlet for connection to the service line, and a temporary barrier in said through-bore adjacent the end of the same opening to the main-engaging surface of the saddle, said temporary barrier protecting the through-bore and/or the lateral outlet from receiving excess solvent cement when the service-T is being solvent-welded to the main.

5. A fitting as claimed in claim 4 in which the main-engaging surface of said saddle is concavely curved about an axis transverse of the axis of the through-bore and is provided with a groove encircling the one end of said through-bore opening thereto, and in which an O-ring is provided in said groove and arranged to make initial sealing contact with the side of said plastic main when said saddle is being solvent-welded to the same whereby the cutter in the through-bore may be operated to cut the hole in the main prior to setting of the solvent cement.

6. A fitting as claimed in claim 5 in which said groove is in said main-engaging surface of the saddle is molded and includes a bottom and inner and outer side walls with at least the outer side wall being parallel to the axis of the through-bore.

7. A fitting as claimed in claim 6 in which said inner side wall of said groove is parallel to said outer side wall and to the axis of the through-bore.

8. A fitting as claimed in claim 6 in which said inner side wall of said groove tapers toward the outer side wall and bottom of said groove.

References Cited

UNITED STATES PATENTS

| | | | |
|---|---|---|---|
| 2,736,335 | 2/1956 | Webber | 137—318 |
| 2,839,075 | 6/1958 | Mueller | 137—318 |
| 3,038,484 | 6/1962 | Smith | 137—15 |
| 3,240,226 | 3/1966 | Burkholder | 137—318 |
| 3,240,227 | 3/1966 | Burkholder | 137—318 |
| 3,295,398 | 1/1967 | Morain | 77—42 |
| 3,307,435 | 3/1967 | Floren | 137—318 X |
| 3,349,792 | 10/1967 | Larkin | 137—318 |

WILLIAM S. BURDEN, Primary Examiner

U.S. Cl. X.R.

137—318